April 26, 1932.   H. G. WEYMOUTH   1,855,502
APPARATUS FOR TESTING DISPENSING APPARATUS
Filed Nov. 19, 1928
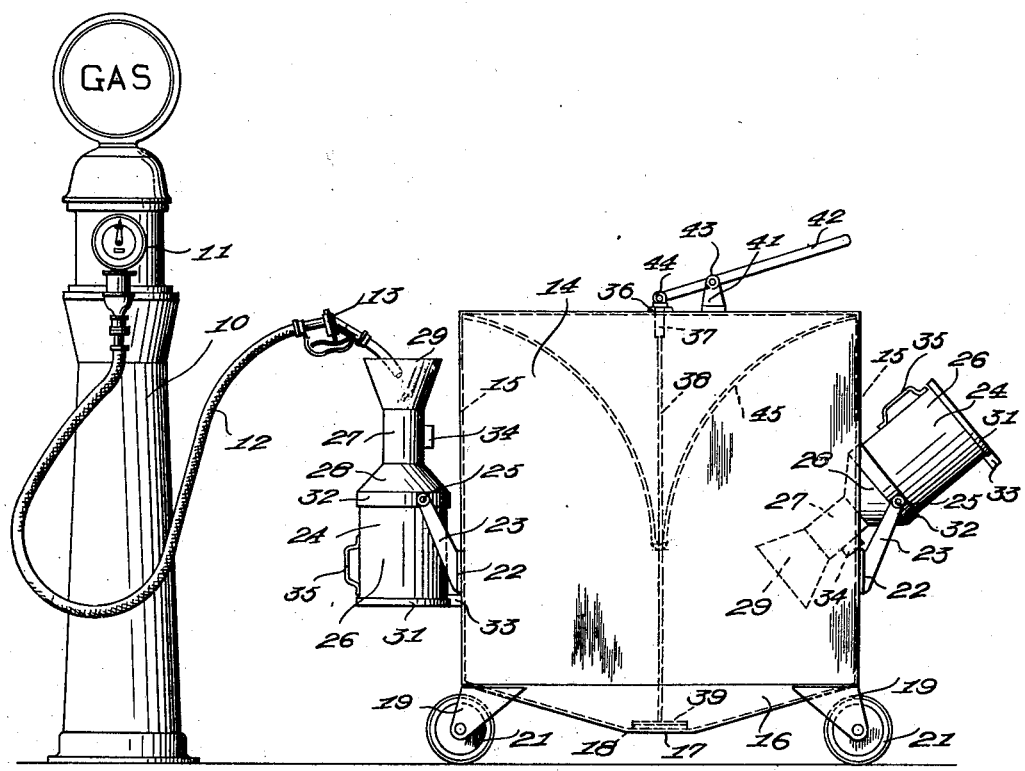
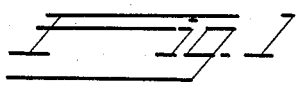
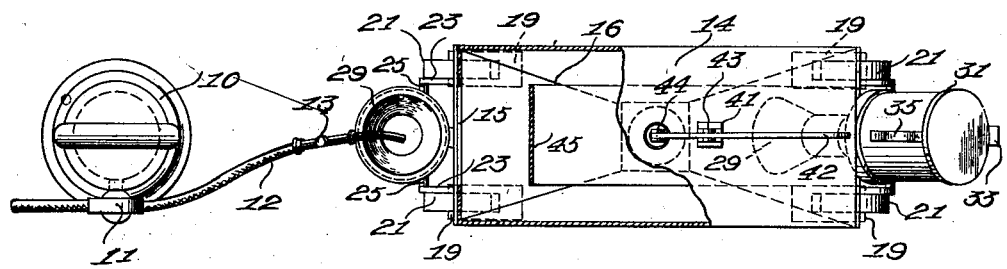
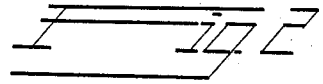
Inventor
Harry G. Weymouth
William A. Strauch
By
Attorney Patented Apr. 26, 1932

1,855,502

UNITED STATES PATENT OFFICE

HARRY G. WEYMOUTH, OF PITTSBURGH, PENNSYLVANIA, ASSIGNOR TO PITTSBURGH EQUITABLE METER COMPANY, OF PITTSBURGH, PENNSYLVANIA, A CORPORATION OF PENNSYLVANIA

APPARATUS FOR TESTING DISPENSING APPARATUS

Application filed November 19, 1928. Serial No. 320,431.

The present invention relates to an apparatus for facilitating the testing of the accuracy of combined measuring and dispensing devices.

More specifically, the invention relates to an apparatus for facilitating the testing of registering meters on gasoline pumps or like fluid dispensing devices.

As is well known, gasoline dispensing pumps are ordinarily provided with measuring mechanisms or meters, and by requirement of the Bureau of Weights and Measures, such mechanisms or meters are required to be accurate, within prescribed tolerances.

Meters and measuring mechanisms with which gasoline pumps are usually provided are subject to derangement under conditions of service causing, at times, incorrect measuring and registering of the fluid dispensed. Accordingly, it is the practice to test and to adjust such meters and mechanisms from time to time to insure continued accuracy. This is done by an official who tests the meters or mechanisms for accuracy, and if necessary, adjusts them through the adjustable by-passes or similar arrangements with which such meters or mechanisms are ordinarily provided. After such inspection the meters are sealed against tampering until the next testing by the official.

The method of testing such meters and mechanisms comprises filling a vessel of known content with gasoline or other fluid and then noting the reading of the meter or mechanism to ascertain whether the dispensing pump or device is dispensing the quantity of fluid indicated by the meter connected therewith, come within the required tolerances.

While such tests by an authorized official are made only at certain times it is the practice of the proprietors of many gasoline or similar stations to make frequent tests at short time intervals to ascertain the accuracy of their dispensing pumps or devices for their own, as well as their customer's protection.

This periodic testing in which a quantity of gasoline is drained from each pump into a measuring vessel requires considerable time, since as heretofore practiced, it is necessary to convey the measuring vessel to the filling port of the reservoir after each pump test. Much time is thus consumed, and inasmuch as the labor is unnecessarily great, a tendency to minimize the number of tests arises. The need of a more expeditious method for carrying out such tests, particularly in gasoline filling stations, has led to the present invention.

It is, accordingly, a primary object of this invention to provide an apparatus for testing fluid dispensing devices whereby the tests are carried out expeditiously and with a minimum of labor.

It is a further object of the present invention to provide an apparatus for testing fluid dispensing devices whereby a plurality of such devices can be tested successively without the necessity of separate set-ups for each dispensing device.

It is a still further object of the invention to provide an apparatus for facilitating the testing of fluid dispensing devices whereby measured quantities of fluid from a plurality of such devices can be easily and quickly restored to the reservoirs of such devices.

With the above objects in view as well as others that will become apparent from the following disclosure, reference will be had to the accompanying drawings forming a part thereof and in which;

Fig. 1 is a side elevational view of the apparatus shown in operative connection with a fluid dispensing device for testing the accuracy of a meter or other measuring mechanism associated therewith.

Fig. 2 is a top plan view partly broken away and in section of the structure illustrated in Fig. 1.

Referring to the drawings by reference characters in which like characters designate like parts, 10 designates a gasoline or other fluid measuring and dispensing device of any well known construction and which, as in quite common practice, is provided with a meter register 11 for indicating the quantity of fluid dispensed by the pump. A gasoline measuring and dispensing device of this type is selected merely for purposes of illustration and it should be understood that the testing apparatus about to be described may be used in connection with gasoline dispensing devices of any form or with other liquids or commodities of any nature. Secured at one end thereof to the dispensing device is a delivering hose 12 of well known type which, adjacent its opposite end, is provided with a flow regulating valve 13.

While I have disclosed a fluid dispensing pump provided with a "wet" type hose, in which the valve is located adjacent the discharge end of the hose, a similar pump with a "dry" type hose, in which the fluid regulating valve is disposed adjacent the pump or meter, may obviously be used.

The meters with which fluid dispensing devices, such as gasoline pumps, are equipped, are liable to get out of adjustment from time to time resulting in an incorrect reading of the quantity of fluid dispensed, as above pointed out, and in order to correct or readjust such meters for a correct reading, they are, as is well known, provided with adjustable by-passes or other adjusting devices for effecting adjustment for correct reading by altering the transverse area of the by-passes, or in any other way, in well known manner.

These adjustments are commonly made by an authorized official who discharges a quantity of fluid through hose 12 after opening valve 13 into a vessel of measured volume and then observing the reading of the meter to ascertain the accuracy thereof.

My invention provides an apparatus for facilitating this method of testing which, in a preferred embodiment thereof, and as illustrated in Figs. 1 and 2, comprises a tank 14 which is preferably constructed of sheet metal. The tank is preferably in the form of a vessel closed at its top, bottom and sides, except for oppositely disposed openings 15 in the ends thereof, for a purpose later to be described. The bottom of tank 14 is preferably inclined inwardly and downwardly from both the sides and ends thereof, as indicated at 16, thus providing an inclined bottom for directing fluid contained therein to the central part thereof which is provided with a drain opening 17 extending therethrough. A boss 18 defining a valve seat for a valve, hereinafter referred to, may be provided to surround said drain opening. Secured in any suitable manner to the bottom of tank 14 adjacent each corner thereof, is a wheel supporting bracket 19 provided with suitable casters, or with wheels 21, thus providing for facile movement of the tank 14 from point to point.

Secured to each end of tank 14 in alinement with the lower edge of opening 15 is a bar 22 to which is secured adjacent the opposite sides of opening 15, a pair of brackets 23 to the outer ends of which, and between which, a measuring vessel 24 is pivotally secured, as indicated at 25. Each measuring vessel 24 is of a measured capacity and may be of any desired configuration and may further be provided with suitable indices for indicating different volumes of fluid. The measuring vessel in the specific embodiment disclosed, comprises a body portion 26, a neck portion 27, united with body portion 26 through a conical portion 28, and an outwardly flared or funnel-shaped head portion 29 connected to neck portion 27. Body portion 26 is provided with a base rim 31 and an outer reinforcing rim or ring 32. Vessel 24 is pivotally connected to brackets 23 at the rim or ring 32 between the longitudinal center thereof, and the adjacent end of tank 14. Rim 31 may be provided with a stop lug 33 normally engaging the adjacent end of tank 14 due to the off center pivotal connection 25, thus causing vessel 24 to normally rest in an upright or vertical position as indicated at the left end of tank 14 in Fig. 1. Neck portion 27 of vessel 24 is provided with a stop and vessel protecting lug 34 for engagement with the upper edge of tank end wall and bar 22 when the vessel is being emptied in tank 14 by swinging it about its pivot 25, as indicated at the right end of tank 14 in Fig. 1. Each vessel 24 is provided with a manipulating handle 35.

It will be observed that the axis of the pivots 25 for each of the vessels 24 is located to one side of the central vertical longitudinal plane of the vessel, when it is positioned as shown at the left of Fig. 1. Such axis is so disposed that the center of gravity of the vessel is disposed to the left of a vertical plane containing said axis when the vessel is in the position shown at the left of Fig. 1 and so that when the vessel is in the position shown at the right of Fig. 1 the center of gravity of the vessel being emptied, is disposed between the vertical plane containing the axis of the vessel pivots and the side of the tank. By this arrangement the vessel is in stable equilibrium when it is being filled as shown at the left of Fig. 1, or when it is being emptied as shown at the right of this figure. That is, it is unnecessary for the attendant to hold the vessel in either of the positions illustrated in said figure. It is thus possible for the attendant to move the tank to the next pump while one or both vessels is draining into said tank. Accordingly, the measuring vessels will drain as the attendant moves from pump to pump and will be ready to receive a quantity of fluid from the next pump when the tank is brought adjacent thereto. This arrangement greatly reduces the time necessary to successively test a plurality of measuring and dispensing devices.

Tank 14 is provided on the top thereof in vertical alinement with valve seat 18, with a boss 36 centrally apertured for receiving a vertically movable member 37 to which the outer end of a valve actuating rod 38 is detachably secured. The inner end thereof carries a valve 39 for cooperation with seat 18 above referred to. Supported by the top of tank 14 adjacent boss 36, is a bifurcated bracket 41 between ears of which a valve actuating handle 42 is pivoted at 43 adjacent one end thereof, which end is pivotally secured to member 37 as indicated at 44.

An anti-splash shield 45 is provided which is of substantially V-form in edge view, with the legs thereof convex in a direction of the vertical axis, as clearly indicated in Fig. 1. The shield is of a width equal to that of openings 15 and the inner end or apex is substantially in horizontal alinement with the inner edges of openings 15, and the legs thereof preferably terminate at the opposite ends of tank 14 immediately inward of the closed top thereof. Shield 45 is apertured in the apex portion thereof for the reception of valve rod 38.

In operation, when it is desired to test the accuracy of the meters on one or more fluid measuring and dispensing devices such as gasoline pumps, tank 14, provided with the measuring vessels 24 and other appurtenances above described, is rolled into proximity to the devices to be tested by means of the wheels 21 with which tank 14 is provided. At such time the measuring vessels are in upright position as indicated at the left of tank 14 in Fig. 1. Hose 12 is now released from the pump and the end thereof introduced into the funnel-shaped head portion of one of the measuring vessels 24, after which gasoline is admitted to the measuring vessel through valve 13, if the hose be of the wet type until a measured quantity of gasoline has been dispensed, as indicated by the measuring vessel. The reading of the meter or other measuring device is then observed to ascertain the degree of accuracy thereof. If the meter does not register the amount of fluid dispensed it is adjusted through suitable adjusting mechanism above referred to. The filling of the measuring vessel may have to be repeated several times before obtaining an accurate adjustment of the meter. This can be done expeditiously because vessel 24 can be emptied after each test by simply inverting the vessel, and permitting it to drain while the adjustment is being accomplished, the stop 34 engaging bar 22 as indicated at the right of tank 14, while the fluid is draining from vessel 24 into tank 14. When the adjustment is made vessel 24 is returned to the vertical or receiving position with stop 33 in engagement with the adjacent end of tank 14. After the meter has been properly adjusted it is sealed against unauthorized tampering.

By the provision of a plurality of measuring vessels the testing can be carried out more expeditously since one vessel can be filling from one pump while another is being emptied of the fluid from another pump, or a plurality of vessels can be simultaneously filled from a like number of pumps and be discharged of their contents into housing 14 while the meters on the plurality of pumps are being observed and adjusted for accuracy.

Shield 45, due to the arcuate disposition of the legs thereof, each of which faces one of the measuring vessels, prevents the fluid from one vessel splashing out of the opening provided for the other vessel and causes the fluid being discharged from the measuring vessels to impinge thereagainst at an angle such as to deflect it toward the bottom and sides of tank 14. Shield 45 not only serves the anti-splash function above described, but it further functions as a guide for the valve rod 38.

While tank 14 is disclosed as being provided with two measuring vessels it will be apparent that a greater number may be employed if desired, for further facilitating the testing operations.

When, during the course of testing, tank 14 has become filled with fluid up to the bottom of openings 15, it is manually transported to the filling orifice for one or more of the pumps and drained of its contents by bearing down on the free end of handle 42, which, due to its lever action, will pull rod 38 upwardly and raise valve 39 from seat 18, permitting the fluid to drain through the opening 17, and tank 14 is then transported to a position for further testing operations. Suitable holding means may be provided to hold the handle 42 in position with the valve 39 open during draining.

Thus, it will be seen that by means of the apparatus herein described, testing operations are greatly facilitated, since a great number of single test quantities of fluid can be quickly discharged into tank 14 and which, when filled, can be easily and quickly drained of its contents.

It is to be observed that when fluid dispensing devices such as gasoline pumps, contain different kinds of fluid or gasoline, those containing a like kind may be tested together in order to avoid mixing the different kinds by discharging into tank 14.

While I have disclosed certain specific embodiments of my invention, such are to be considered as illustrative only and not restrictive, since the scope of my invention is defined in the subjoined claims. Accordingly, what I claim and desire to secure by United States Letters Patent is:

1. A testing device for measuring the accuracy of fluid dispensing systems comprising a portable tank provided with openings therein; a fluid measuring vessel pivotally connected with said tank adjacent each of said openings; said measuring vessels being pivoted in a manner as to normally rest in an upright position for receiving fluid to be measured from the dispensing system under test, and being adapted to be swung on their pivotal connections into said openings for emptying the fluid contained therein into said tank.

2. The combination defined in claim 1 in which said tank is provided with an anti-splash shield for preventing splashing through said openings and for directing the fluid discharged from said measuring vessels toward the bottom of said tank.

3. The combination defined in claim 1 in which said tank is provided with an inclined bottom having a central drain aperture; and valve means supported by said tank for controlling said aperture.

4. Apparatus for testing the accuracy of meters on fluid dispensing devices, comprising a portable tank provided with an opening in each end thereof; a fluid measuring vessel pivotally connected to said tank adjacent each of said openings for receiving fluid from said fluid dispensing devices and adapted to be swung on their pivotal connections to a downwardly inclined stable position through said openings for draining the fluid contents thereof into said tank.

5. The combination defined in claim 4 in which each of said measuring vessels is pivotally connected to one side of the longitudinal center thereof to the outer ends of brackets projecting outwardly from the base of said openings and in which each of said vessels is provided with a lug for normally engaging said tank for maintaining said vessel in an upright fluid receiving position and a second lug for engaging said tank for limiting the movement of said vessel in its inclined discharging position.

6. The combination defined in claim 4 in which said tank is provided with a valve controlled discharge opening in the base thereof; an anti-splash shield; and a valve actuating rod extending through and guided by said shield; and means supported by the top of said tank for actuating said rod.

7. Fluid meter testing apparatus comprising a portable tank provided with an opening in each end thereof, and a valve controlled drain opening in the base thereof; an anti-splash shield supported in said tank; a valve actuating rod extending through said shield and the top of said tank; a lever pivotally connected to the top of said tank for actuating said rod; and a fluid measuring vessel pivotally connected to said tank opposite each of said openings.

8. The combination defined in claim 7 in which said anti-splash shield comprises a pair of outwardly diverging aprons each of which is positioned inwardly of, and in line with one of said openings and which is convex toward said opening so that fluid from one vessel may not splash through the opening in the opposite wall of the tank provided for the other vessel.

9. Fluid meter testing apparatus comprising a wheel supported tank provided with an inclined bottom having a central valve controlled fluid discharge opening and an opening in each end thereof; an anti-splash shield comprising an arcuate portion opposite each of said openings; a valve actuating rod extending through said shield and the top of said tank; a rod actuating lever pivotally secured to the top of said tank; a pair of laterally spaced brackets projecting outwardly from said tank adjacent each of said openings; a measuring vessel pivotally secured intermediate its ends and to one side of the longitudinal center thereof to each pair of said brackets; a lug carried by each of said vessels normally engaging said tank below the respective opening for retaining said vessel in an upright fluid receiving position; and means to support each of said vessels when swung about its pivotal connection to a downwardly inclined position within the adjacent opening for draining the fluid contents thereof into said tank.

10. Testing apparatus comprising a portable tank, a measuring vessel, means to secure said vessel to said tank, said means being arranged to support said vessel in stable equilibrium in fluid receiving position, and to support said vessel in stable equilibrium when it is moved to a position in which it discharges its contents into said tank.

11. Testing apparatus comprising a portable tank of substantial capacity, a fluid measuring vessel of small capacity pivoted to said tank, the pivots of said vessel being arranged so that said vessel assumes a position of stable equilibrium when the vessel is in position to receive the fluid to be measured and when it is swung about its pivot to discharge the fluid measured into said tank.

12. A testing device for measuring the accuracy of fluid dispensing systems comprising a portable tank of substantial capacity, a measuring vessel of small capacity associated with said tank so that the contents thereof may readily be emptied into said tank and means within said tank to minimize the splashing of fluid from said tank as said vessel is being emptied thereinto.

13. A testing device for measuring the accuracy of fluid dispensing systems comprising a portable tank for temporary disposition adjacent the dispensing system to be tested, an open-top vessel of measured fluid capacity adapted to receive a measured quantity of fluid from the dispensing system, and means for supporting said vessel on said portable tank for receiving liquid and for facilitating the emptying of the fluid into said tank.

14. The invention as defined in claim 13 wherein said tank is provided with a valve for emptying the same after repeated testing operations.

15. The invention as defined in claim 13 wherein said vessel is pivotally supported on said tank, and said tank has an enlarged opening through which the open top of said vessel may pass for emptying the vessel into the tank.

In testimony whereof I affix my signature.

HARRY G. WEYMOUTH.